United States Patent
Tariolle et al.

(10) Patent No.: US 9,185,335 B2
(45) Date of Patent: Nov. 10, 2015

(54) METHOD AND DEVICE FOR RECEPTION OF VIDEO CONTENTS AND SERVICES BROADCAST WITH PRIOR TRANSMISSION OF DATA

(75) Inventors: Francois-Louis Tariolle, Cesson Sevigne Cedex (FR); Eric Gautier, Cesson Sevigne Cedex (FR); Vincent Bottreau, Chateaubourg (FR)

(73) Assignee: THOMSON LICENSING, Issy les Moulineaux (FR)

( * ) Notice: Subject to any disclaimer, the term of this patent is extended or adjusted under 35 U.S.C. 154(b) by 573 days.

(21) Appl. No.: 12/967,720

(22) Filed: Dec. 14, 2010

(65) Prior Publication Data
US 2011/0158607 A1   Jun. 30, 2011

(51) Int. Cl.
*H04N 5/78* (2006.01)
*H04N 5/781* (2006.01)
*H04N 5/775* (2006.01)

(52) U.S. Cl.
CPC ............ *H04N 5/781* (2013.01); *H04N 5/775* (2013.01)

(58) Field of Classification Search
CPC ............ G11B 220/90; G11B 27/3027; G11B 27/034; H04N 9/8042; G01B 27/105
See application file for complete search history.

(56) References Cited

U.S. PATENT DOCUMENTS

| | | | |
|---|---|---|---|
| 6,456,781 B1 * | 9/2002 | Rijckaert | 386/317 |
| 6,496,980 B1 | 12/2002 | Tillman et al. | |
| 2002/0051581 A1 | 5/2002 | Takeuchi et al. | |
| 2003/0023982 A1 | 1/2003 | Lee et al. | |
| 2005/0041745 A1 | 2/2005 | Zhang et al. | |
| 2006/0193599 A1 | 8/2006 | Thijssen | |
| 2006/0197828 A1 * | 9/2006 | Zeng et al. | 348/14.13 |
| 2008/0256615 A1 | 10/2008 | Schlacht et al. | |
| 2009/0213938 A1 * | 8/2009 | Lee et al. | 375/240.24 |

FOREIGN PATENT DOCUMENTS

| | | |
|---|---|---|
| CN | 1251196 | 4/2000 |
| CN | 1941916 | 4/2007 |
| EP | 1773072 | 4/2007 |
| JP | 11150720 | 6/1999 |
| JP | 2002010251 | 1/2002 |

(Continued)

OTHER PUBLICATIONS

Basso et al., "Transmission of MPEG-2 Streams Over Non-Guaranteed Quality of Service Networks", AT&T Labs, 1997.

(Continued)

*Primary Examiner* — William C Vaughn, Jr.
*Assistant Examiner* — Daniel Tekle
(74) *Attorney, Agent, or Firm* — Tutunjian & Bitetto, P.C.

(57) ABSTRACT

The invention relates to a method for reception of video contents and services streamed or broadcast by a television operator towards a multitude of reception devices, the encoded video contents and services being split into a first data stream and a second data stream, comprising a step for receiving the first data stream streamed or broadcast in a first transport session, a step for receiving the second data stream transmitted in a second transport session, the second data stream being transmitted prior to the first data stream and the second data stream not being able to be decoded without the first data stream, a step for recording the second data stream in a storage means of the device, a step for continuously synchronizing the second data stream with the first data stream into a stream being sent to the decoding means.

16 Claims, 7 Drawing Sheets

(56) References Cited

FOREIGN PATENT DOCUMENTS

| JP | 2005136762 | 5/2005 |
|---|---|---|
| JP | 2009147571 | 7/2009 |
| WO | WO9928900 | 6/1999 |
| WO | WO02089461 | 11/2002 |
| WO | WO03004783 | 1/2003 |
| WO | WO2004057874 | 7/2004 |
| WO | WO2006125850 | 11/2006 |
| WO | WO2008066257 | 6/2008 |

OTHER PUBLICATIONS

French Preliminary Search Report dated Apr. 20, 2010.
Huang et al., "A display order oriented scalable video decoder", Asia Pacific Conf. on Circuits and Systems 2006, Singapore, Dec. 4, 2006, pp. 1976-1979.
ZINK et al., "Scalable TCP-Friendly Video Distribution for Heterogeneous Clients", Proc. of SPIE—Int. Soc. for Optical Eng., vol. 5019, No. 1, 2003, pp. 102-113.
Hartung et al., "A real-time scalable software video coded for collaborative applications over packet networks", ACM Multimedia '98 Proceedinas, ACM, New York, NY, pp. 419-426.
Schulzrinne et al., "RTP: A transport protocol for real-time applications", Network Working Group, Request for Comments 3550, Jul. 2003, pp. 1-92.
Paila, et al., "FLUTE—Delivery over Unidirectional transport", Network Working Group, Request for Comments 3926, Oct. 2004, pp. 1-34.
Wenger et al., "Transport and signaling of SVC in IP networks", IEEE Trans CSVT, vol. 17, No. 9, Sep. 2007, pp. 1164-1173.
Schierl et al., "Mobile Video Transmission Using Scalable Video Coding", IEEE Trans CSVT, vol. 17, No. 9, Sep. 2007, pp. 1204-1217.
Wenger et al., "RTP Payload Format for SVC Video", Audio/Video Transport WG, Nov. 3, 2008, pp. 1-102.
Hannuksela et al., "Session multiplexing for SVC video", Audio/Video Transport WG, Jul. 14, 2008, pp. 1-21.
Wenger et al., "RTP Payload Format for H.264 Video", Network Working Group Request for Comments 3984, Feb. 2005, pp. 1-83.
ETSI EN 301 192 V1.4.2, "Digital Video Broadcasting (DVB); DVB specification for data broadcasting", Apr. 2008, pp. 1-79.
ETSI TS 102 468 V1.1.1 Standard, "Digital Video Broadcasting (DVB); IP datacast over DVB-H: Set of specifications for phase 1", Nov. 2007, pp. 1-8.
ISO IEC 13818-1 International Standard, "Information technology—Generic coding of moving pictures and associated audio information: Part 1: systems", Dec. 1, 2000, pp. 1-174.
ETSI EN 300 468 V1.9.1 Standard, "Digital Video Broadcasting (DVB); Specification for Service Information (SI) in DVB systems", Mar. 2009, pp. 1-116.
ISO/IEC 13818-6 International Standard, "Information technology—Generic coding of moving pictures and associated audio information-Part 6: Extensions for DSM-CC", Sep. 1, 1998, pp. 1-8.
ETSI TS 102 034 V1.4.1 Standard, "Digital Video Broadcasting (DVB); Transport of MPEG-2 TS Based DVB Services over IP Based Networks", DVB specification for data broadcasting, Aug. 2009, pp. 1-229.
Wiegand et al., "Joint Draft of ITU-T Rec. H.264/ ISO/IEC 14496-10/ Amendment 3 Scalable Video Coding", JVT of ISO/IEC MPEG & ITU-T VCEG, 24th Meeting, Geneva, Switzerland, Jun. 29, 2007, pp. 1-563.
CM-AVC0137 SVC commercial requirements Version 1.4.3, "CM-AVC requirements on scalable video coding", Feb. 25, 2009, pp. 1-9.

\* cited by examiner

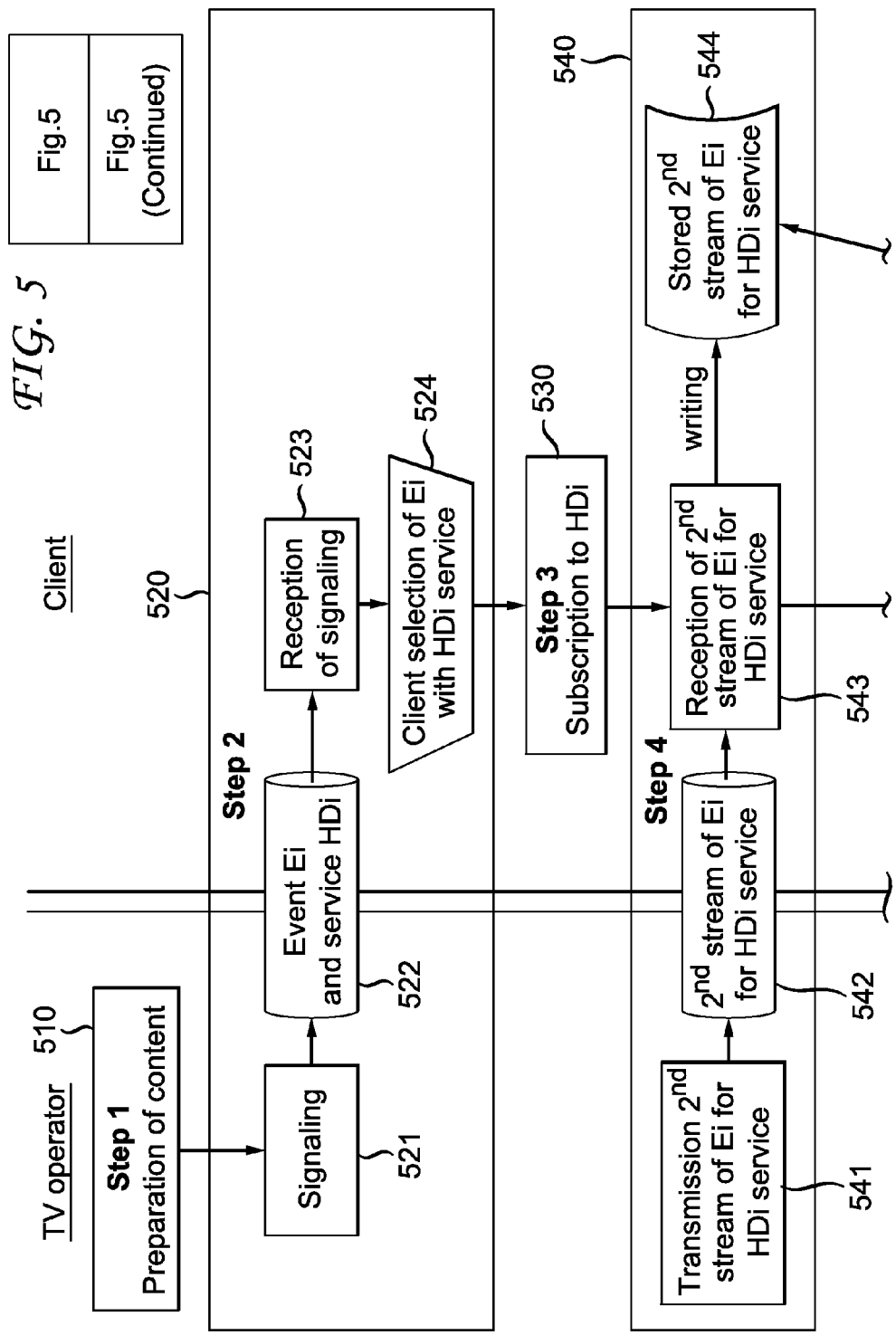

METHOD AND DEVICE FOR RECEPTION OF VIDEO CONTENTS AND SERVICES BROADCAST WITH PRIOR TRANSMISSION OF DATA

This application claims the benefit, under 35 U.S.C. §119 of French Patent Application 0959618, filed Dec. 28, 2009.

FIELD OF THE INVENTION

The invention relates to the general domain of digital content broadcast via a network. More specifically, the invention relates to a method and device for reception of video contents and services broadcast by a television operator with prior transmission of data.

BACKGROUND OF THE INVENTION

To offer a digital television service, a television operator or broadcaster transmits video contents over satellite, cable or radio broadcast networks, over IP broadband networks or again over mobile networks to several clients at a time according to the principle of broadcast or multicast diffusion. Television over IP (or IPTV) has developed since the explosion in end user very high bitrate access offers. The broadcasting of video requires a high bitrate on the network. On open wired (Open Internet type) or managed (by a Free type access provider) networks, the bandwidth of the access point of the client conditions the eligibility of said client for the IPTV services and also conditions the coding quality of video contents, for example high definition (HDTV). Thus depending on his bandwidth, the client receive no television channel or no Video On Demand service at all, receive TV programmes in standard quality, or receive different contents in high definition. The bandwidth of the client depends on technical characteristics of the access network and on the congestion of the network. For broadcasting over mobile networks, such as 3G telephony, the problem of limitations of the bandwidth is also present, the constraint in term of bandwidth even being higher.

Different solutions are proposed to increase the eligibility of individuals for IPTV or VOD services and to improve the quality of broadcast contents. A first series of solutions exists based on image processing, such as SD-HD upscaling or digital zoom including filtering. However these solutions offer a mediocre result compared to the original HD content. In the networks domain, very high bitrate accesses are being developed. In the compression domain, the use of standards such as H.264/MPEG-4 AVC (Advanced Video Coding) or H.264/MPEG-4 SVC (Scalable Video Coding) enables the improvement of the compression rate of broadcast contents. SVC also enables the transport to be split into different streams adapted to the different capacities of broadcast networks thus offering a video quality that can be adapted to the bandwidth of receivers. In fact, according to the "scalability" model, different SVC streams correspond to different successive levels of quality of a same content (hierarchically dependent and coded incrementally) and the AVC base layer can be decoded without the enhancement layers. However, the different streams are transmitted simultaneously on the network. Thus, a client can benefit from an IPTV service in standard definition if his bandwidth is sufficient to receive a base layer in real time but can not benefit from an IP-HDTV service if his bandwidth is insufficient to receive the enhancement layers in real time.

In the context of a unicast transmission on a wideband network, the document WO 03/04783, describes a method for broadcasting of music in which the data streams are divided and are not transmitted simultaneously. A first stream is previously transmitted then it is stored in memory. A second stream is transmitted in real time, it is combined with the first stream in a way to enable the reproduction of a piece of music in real time. This solution enables the real time constraints on the complete stream to be overcome and enables the bandwidth in real time resources to be optimised. Still in the domain of unicast transmissions, the document U.S. Pat. No. 6,496,980 describes a method for unicast transmission with two non-simultaneous streams. The base layer is received in real time and offers a standard quality. Upon request by the user, the enhancement layers are downloaded thus offering the user the advantage of a new reproduction of the video content with an improved quality.

These solutions do not address the technical problem of eligibility for a television broadcast service on a wideband network for which the bandwidth of the access point does not enable the reception in real time of video streams of a quality sufficient for its reproduction. These solutions also do not address the technical problem of the broadcasting of a HD television service in real time in particular on a "broadcast" network or on a wideband network for which the bandwidth of the access point is insufficient.

SUMMARY OF THE INVENTION

The purpose of the invention is to overcome at least one of the disadvantages of the prior art.

More specifically, the purpose of the invention is to enable the multicast digital broadcast on an IP network in real time of a TV or VOD service while limiting the real time bitrate necessary to this service. The purpose of the invention is also to enable the digital broadcast in real time, notably on hybrid networks (combining a radio, satellite or cable network and an IP network), of an improved quality service, for example TVHD, while conserving the stream bitrate of a base layer quality, for example SD and thus to optimise the number of channels broadcast simultaneously.

In the prior art, the content is broadcast on a network by a television operator to a multitude of receivers in real time. It is also known in the art in a point to point link on an IP network that a content can be divided out and downloaded into several transport sessions on the reception device. The idea of the invention is to combine the real time broadcasting and the prior downloading of a same content notably on hybrid networks.

For this purpose, the invention relates to a method for reception of video contents and services streamed or broadcast by a television operator towards a multitude of reception devices, encoded video contents and services being split into a first data stream and a second data stream, comprising a step for receiving the first data stream streamed or broadcast in a first transport session, a step for receiving the second data stream transmitted in a second transport session, the second data stream being transmitted prior to the first data stream and the second data stream not being able to be decoded without the first data stream, a step for recording the second data stream in a storage means of a reception device, a step for continuously synchronizing the second data stream with the first data stream into a stream being sent to the decoding means.

Advantageously, a television operator broadcasts on an IP network, a first SVC compressed stream for which the bitrate is reduced and proposes in prior downloading different enhancement layers. Thus clients that would not be eligible for an IPTV service due to the limited bandwidth of their network access, could become eligible.

In order to offer the HD quality service, a television operator advantageously proposes prior downloading, onto the reception device of the client, enhancement layers of a HD content encoded according to the SVC standard, for example during the night preceding the broadcast. On reception of the real time streamed SVC base layer, the receiver synchronises the downloaded stream with the real time stream, the client having subscribed to this service advantageously profits from the HD quality of the content streamed for example in SD quality.

Finally, in the context of hybrid networks, a television operator implementing the invention proposes a TVHD service by downloading onto an IP network HD enhancement layers to clients that have subscribed to the service, while conserving an SD broadcast on the broadcast network. The television operator thus advantageously optimizes the number of channels broadcast simultaneously.

According to a particular characteristic of the invention, the step for continuously synchronizing the second data stream with the first data stream, uses timestamps associated with the first data stream and inserted into the first transport session and timestamps associated with the second data stream and inserted into the second transport session. A regular synchronization of the real time stream and the downloaded stream is thus made possible by these markers and is particularly well adapted to the problems of delays introduced in direct broadcast by commercial announcements for example.

According to another particular characteristic of the invention, the step for continuously synchronizing the second data stream with the first data stream uses an identifier associated with each of the video contents and services, this identifier is inserted into the first transport session and into the second transport session. Among several downloaded files corresponding to several contents, this identifier enables the downloaded enhancement layer corresponding to the stream being broadcasted to be selected. The identifier associated with each of video contents and services is advantageously derived from a characteristic of the content such as the title of the video content or service or the theoretical date and time of the streaming or broadcast of the video content or service.

According to a particularly advantageous aspect of the invention, it comprises a step for receiving signalling of video contents and services streaming or broadcast comprising information on the first transport session and on the second transport session. This information informs the clients of the television operator about the video stream pre-downloading service and about the selection of the streams to download.

According to a particularly advantageous aspect of the invention, it also comprises a step for activating the reception of the first data stream from these items of signalling information on the transport sessions. According to another advantageous aspect, it also comprises a step for activating the reception of the second data stream from items of signalling information on the transport sessions or from a selection by the user of the reception device. This selection is carried out on demand for each of the contents or automatically via a subscription service subscribed to by the user. Thus the method has the advantage of an automatic content downloading and recording in the reception device of a client subscribing to the pre-downloading service. According to another embodiment, the method has the advantage of an automatic triggering of the live reception of a content partly downloaded by the client.

Finally, according to a particularly advantageous aspect of the invention, it also comprises a step for deleting, in the storage means of the reception device, the second data stream after the transmission of the first data stream in a first transport session.

BRIEF DESCRIPTION OF THE DRAWINGS

The invention will be better understood and illustrated by means of embodiments and advantageous implementations, by no means limiting, with reference to the figures in the appendix, wherein.

DETAILED DESCRIPTION OF PREFERRED EMBODIMENTS

The present invention comprises a method and a device in which the client downloads a part of a video stream in advance, receives the other part of the stream broadcast in real time by a television operator and synchronizes the two parts of the stream to benefit from a television service with enhanced quality. The video contents and services broadcast by a television operator comprise, as a non-restrictive example, recorded television programmes and "near" VOD services. However, the method is not adapted to "live" television programmes in the sense of an event occurring at the time that it is being broadcast. The video contents and services are transmitted live or in real time or again in streaming on a broadcast network, as opposed to downloaded contents or services without the constraints of real time and bandwidth. According to a preferred embodiment, these video contents are compressed according to the SVC standard comprising the base layer and the enhancement layers, the division being carried out according to these stream levels. Naturally, the invention is not limited to this embodiment. A variant comprises a division of an MPEG2-TS video transport stream into two parts, the first part comprising for example the headers of TS packets, the second part comprising the data packets. According to another variant, the content can be divided sequentially into one tenth of the data in a first stream and nine tenths of the data in a second stream. Thus the second stream or streams are not adapted to be decoded alone, that is to say without the first stream, which is particularly well adapted to the security of contents. However, in the preferred embodiment and contrary to the proposed variants, the first stream can advantageously be decoded alone and moreover, is compatible with current MPEG4 decoders (MPEG4-AVC).

Figure 1:
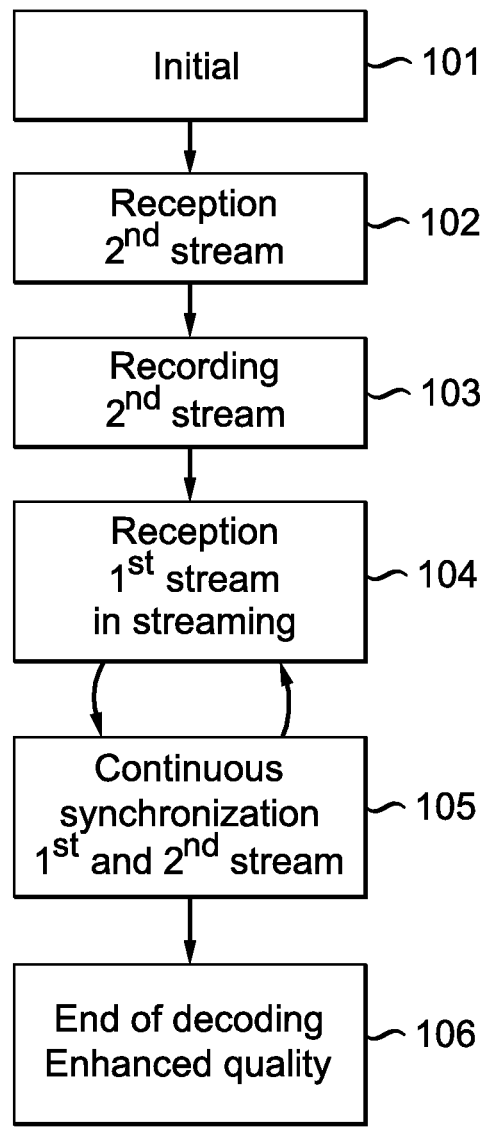
FIG. 1 shows the reception method according to a particular embodiment.

FIG. 1 diagrammatically shows the reception method according to a particular embodiment. A content is divided into two streams called the first and second stream. From an initial step 101, a step of reception 102 of the second stream is reached. This second stream is transmitted in a second transport session, for example by downloading on an Internet type open network or on a network managed by an access provider, according to a protocol such as FTP, HTTP, or P2P for unicast transmissions or again FLUTE for unicast or multicast transmissions. During step 103, the second stream is recorded in the storage means of the reception device. Then, the first stream is transmitted live in a first transport session. According to an embodiment called DVB-IPTV, this first session comprises a multicast streaming on a network managed by a access provider using an RTP protocol adapted to a real time video service. According to another embodiment called DVB-MPEG2-TS, this first session comprises streaming an MPEG2-TS transport stream on a radio, satellite or terrestrial network. By combining a download in the broadband networks domain and a broadcast in the radio, satellite or terrestrial networks domain, the invention is situated notably in the context of hybrid networks. A unified synchronization method between these two domains must therefore be established in particular at the level of the timestamps. Step 104 of reception of this first stream transmitted live is then reached. In parallel, a step 105 of synchronization comprises the combination of data of the recorded second stream and of the first stream as it is received, and the reconstruction of the initial stream of enhanced quality before division and transport. The stream thus obtained after the step 105 of synchronization is decoded during a step 106 that marks the end of the reception method.

Naturally, the invention is not limited to the embodiment previously described. In particular, the invention is compatible with all combinations in number of transport sessions and number of streams comprised in the content. However, when the embodiment uses an SVC compression, the hierarchy of SVC streams will be advantageously respected, the base layer streams or streams of low quality being transmitted in streaming and the enhancement layers being pre-downloaded, to enable an independent decoding of base layer or low quality streams.

Figure 2:
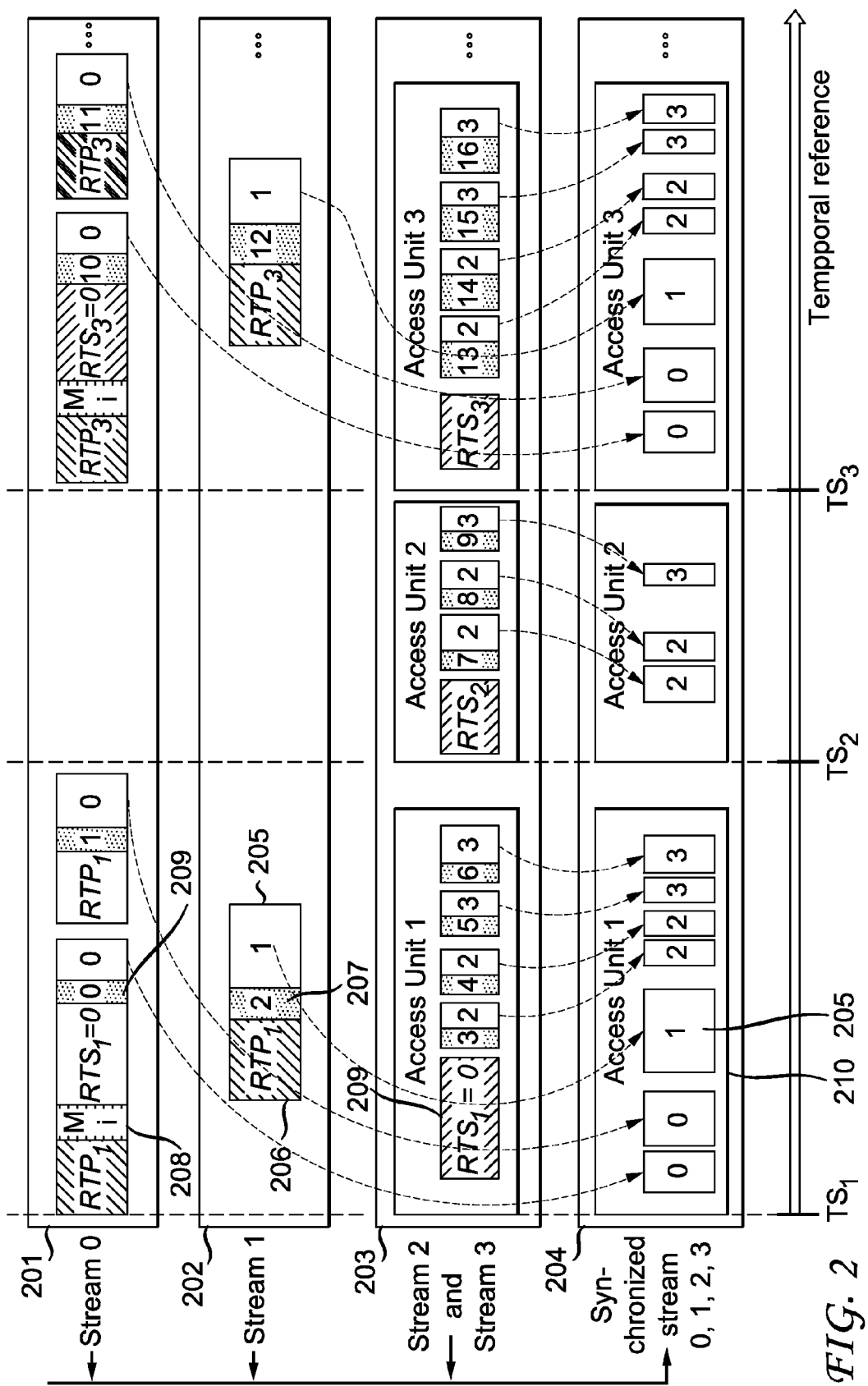
FIG. 2 shows the step of synchronization implemented in the reception device according to a particular embodiment.
Figure 3:
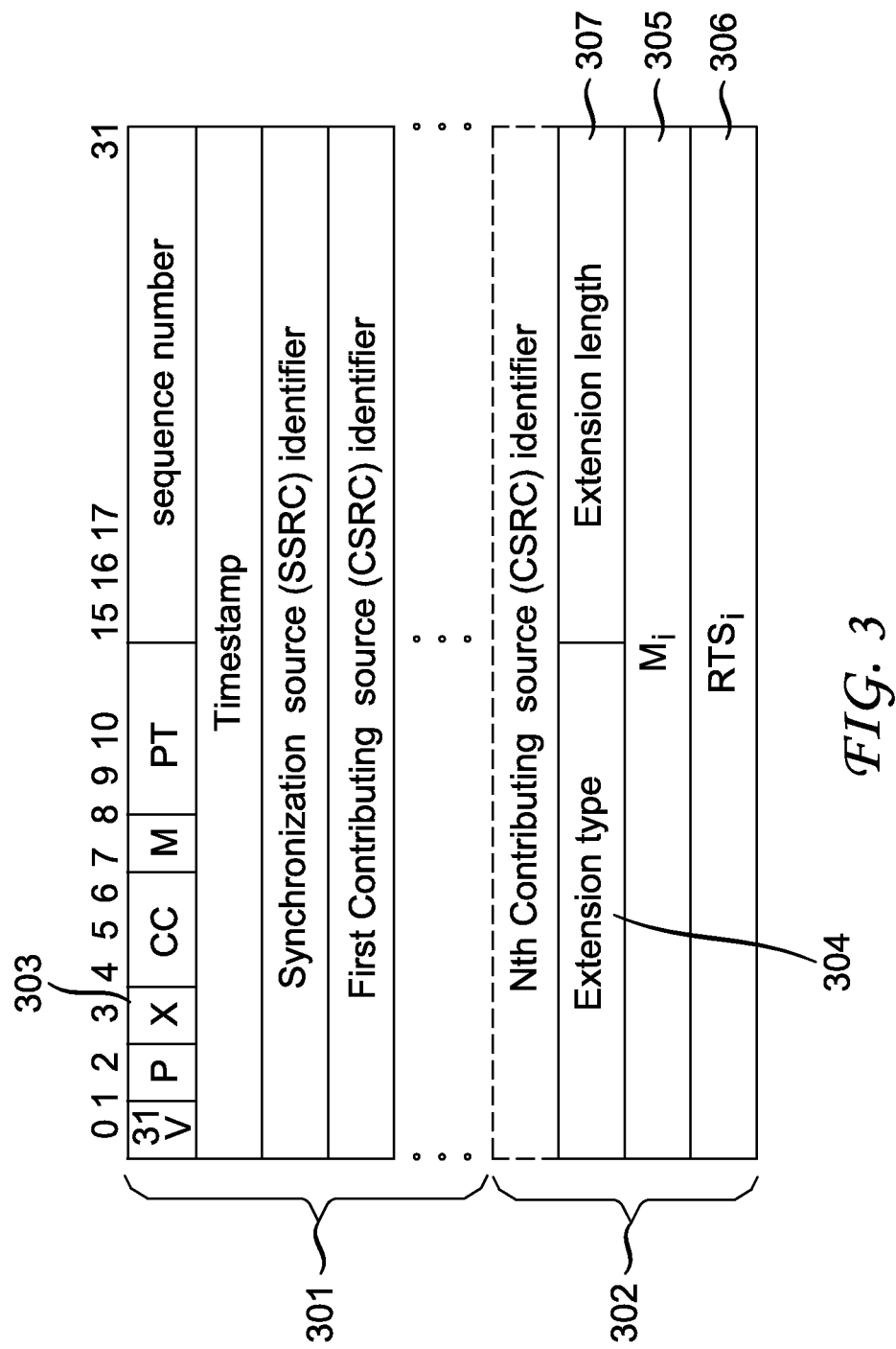
FIGS. 3 and 4 show transport packets of the data streams according to two embodiments (DVB-IPTV and MPEG2-TS)

FIG. 2 shows the step of synchronization implemented in the reception device according to a particular embodiment, more specifically FIG. 2 shows the use of an identifier and of timestamps to implement this function. In the embodiment of FIG. 2, the content is SVC encoded. Based on the AVC format, an SVC binary stream comprises a succession of "Access Units" (AC), each AU representing a unique video image at a given time. The notion of "Network Access Layer Unit" (NAL) defines a slice of a video frame as a decoding unit. Each NAL corresponds to a base or enhancement layer as introduced by SVC, and several NAL form an AU. FIG. 2 shows a content comprising 4 stream levels, the stream 0 corresponding to base layer and the streams 1, 2 and 3 to enhancement layers. The stream 0 is streamed in a transport session 201 for example according to the RTP protocol, the stream 1 is streamed in another simultaneous transport session 202 for example according to the RTP protocol, the streams 2 and 3 are recorded in the form of a file 203 in the storage means of the reception device. The step of synchronization comprises the ordering of different AU 210 numbered 1 to 3 and different NAL each comprised into AUs of a content partly downloaded and partly streamed.

A content broadcast constitutes an event $E_i$. An identifier $M_i$ 208 is associated with the event $E_i$, that is to say with each of the contents. According to an embodiment, this identifier is derived from the title of the content encrypted by a hash function. According to a variant, this identifier 208 is derived from the date and theoretical time of broadcast of the programme. This identifier 208 enables the file or files downloaded and recorded to be associated with the live broadcast streams. This identifier 208 is transmitted at the level of the transport session, for example on the IP network in the RTP packets or on a DVB network in the adaptation field of MPEG2-TS. Advantageously this identifier 208 is recorded in the metadata associated with the downloaded file.

According to an embodiment, timestamps associated with each stream and transmitted at the level of the transport session are used to synchronize the different streams. In the domain of IP networks, the document "RTP Payload Format for SVC Video" (draft-ietf-avt-rtp-svc-15.txt by S. Wenger, Y.-K. Wang, T. Schierl, A. Eleftheriadis of Nov. 3, 2008) proposes a technical solution to synchronize different SVC streams transmitted in streaming in different RTP sessions. This solution uses the "Decoding Order Number" introduced by the document "RFC 3984: RTP Payload Format for H.264 Video" (by S. Wenger, M. M. Hannuksela, T. Stockhammer, M. Westerlund, D. Singer, dating from February 2005). This DON information 207 is transported in RTP packets in a specific format for H264. In addition, the document "RTP Payload Format for SVC Video" also describes a timestamp (or TS) for each $AU_j$, $TS_j$ is transported in the header 206 of RTP packets. $TS_j$ is used to order the RTP packets of different transport sessions. However according to different embodiments in which streams are either transmitted using RTP protocol, are downloaded into a file or are transmitted according to a protocol adapted to real time, the technical problem is to synchronize several SVC streams from transport sessions. Thus according to a particular characteristic of the invention, a new timestamp $RTS_j$ 209 (Reference Timestamp) is defined for each of the first NAL units of each of the $AU_j$ of each of the transport sessions of the SVC stream. The timestamp RTS 209, similar to the DON 207 is defined on 32 bits. The timestamp RTS 209 enables all of the NAL 205 of a same AU 210 coming from different transport sessions of the stream (streamed or previously downloaded) for example $RTS_1$ and $RTS_3$ to be grouped in 201 and 203. The timestamp RTS also enables the additional downloaded files AUs and the streamed AUs, for example $RTS_1$ and $RTS_2$, to be ordered in 201 and 203. These different timestamps are defined. A new downloaded file format and a transport stream are defined according to the embodiments including this timestamp information.

FIG. 2 thus shows a stream composed of 3 AUs 210. Each AU 210 comprises NAL units 205 transmitted for example using RTP protocol. A header RTP 206 transports a $TS_j$ for each AU. The RTP packet transports an item of identification information of the content $M_i$ 208, an item of DON information 207 for each NAL, and an item of $RTS_j$ information for each AU. RTS of first AU is initialized at 0. Then TS and RTS are calculated in a way to be coherent in the new file format and in the transport session thus:

$$TS[AU(j)]-TS[AU(j-1)]=RTS[AU(j)]-RTS[AU(j-1)].$$

According to another embodiment, contents are broadcast on a broadband IP network, thus offering an IPTV service as defined in the standard DVB-IPTV (in "DVB-IPTV 1.4: Transport of MPEG 2 TS Based DVB Services over IP Based Networks", dTS 102 034 V1.4.1, dated September 2008). In this embodiment, the second transport session, that is to say the files downloading, uses CDS (Content Download Service) technology assuring the content signalling and transport. Besides, the first transport session, that is to say the content streaming, uses RTP protocol. According to a particular characteristic, the identifier $M_i$ is derived from the CRID (Content Reference Identifier) introduced in the DVB-IPTV Broadband Content Guide compressed for example by a hash function. The identifier $M_i$ is transmitted with the CDS signalling information.

According to a particular characteristic, the identifier $M_i$ and the RTS timestamps are transmitted in RTP packets. FIG.

3 shows RTP transport packets of the stream received in streaming according to the DVB-IPTV embodiment. A new RTP header format is defined, it comprises an RTP header 301 and an RTP header extension 302 completed by the X bit 303 of the header 301. The header extension field 302 advantageously comprises an identifier field $M_i$ 305 and an AU timestamp field RTS 306. These new fields are coded on 32 bits. The type 304 and the length 307 of the new header extension field 302 are advantageously completed. In addition, the RTP packets are adapted to the synchronization of different SVC streams streamed on an IP network in different RTP sessions in particular DON fields are present in each RTP packets.

Figure 4:
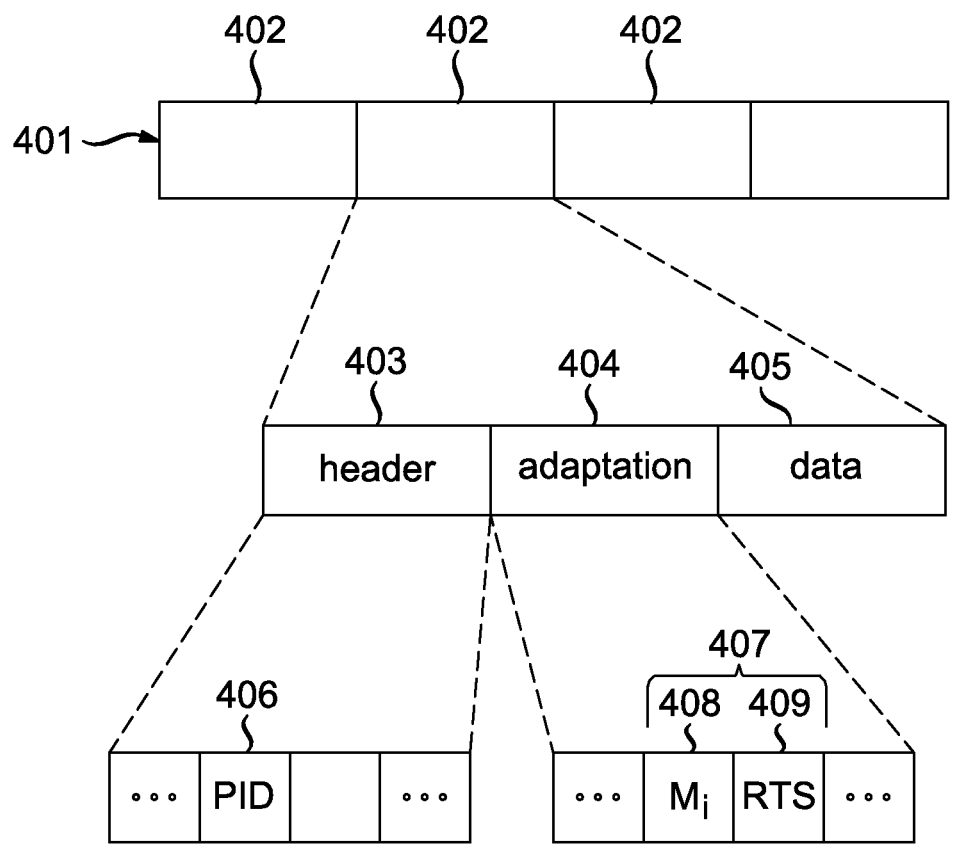

According to another embodiment, the contents are broadcast on a satellite, cable or terrestrial broadcast network using the standard MPEG2-TS (in ISO/IEC 13818-1: "Information technology—Generic coding of moving pictures and associated audio information: Part 1: Systems"). In this embodiment, the second transport session, that is to say the files downloading, uses the technology DSMCC or FLUTE on MPEG2-TS. Moreover, the first transport session, that is to say content streaming, uses the TS transport packets of MPEG2. FIG. 4 shows MPEG2-TS transport packets 402 of the first stream 401 received live according to the DVB-MPEG2-TS embodiment. A TS packet 402 comprises a header 403, an optional adaptation field 404 and useful data 405. According to a particular characteristic, the identifier $M_i$ 408 and the timestamps RTS 409 are transmitted in the adaptation field 403, dedicated to the transport of private data. This field comprises 11 additional bytes of which 4 bytes are for the identifier $M_i$ and 4 bytes are for the RTS timestamp. In this case, the DON concept is not used as in the case of an RTP transport as the order of NAL units is conserved in the case of a MPEG2-TS transport. In addition, the RTS is not calculated in relation with the RTP timestamp but with the presentation timestamp or PTS relative to the PCR clock and such that:

$$PTS[AU(j)]-PTS[AU(j-1)]=RTS[AU(j)]-RTS[AU(j-1)].$$

Figure 5:
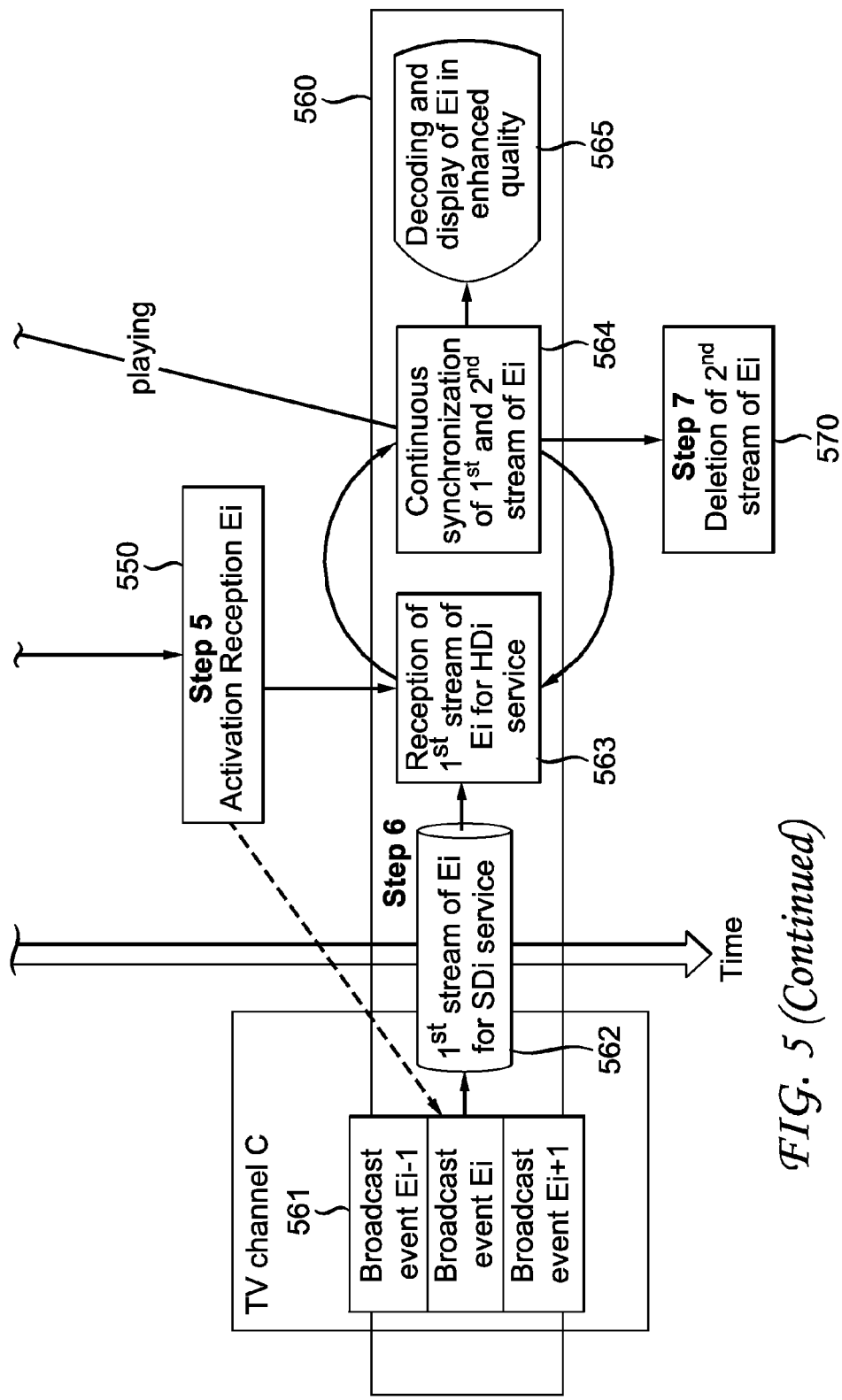
FIG. 5 shows the broadcast method including different variants of the steps of transmission and reception.

FIG. 5 shows the broadcast method including different variants of the steps of transmission and reception. During a first step 510, the television operator prepares the broadcast of a content for a given date and time, this broadcast corresponds to the event $E_i$: the video content is compressed into a binary stream divided into several parts (or at least a first stream and at least a second stream) intended to be transmitted to clients over at least 2 transport sessions. A second step 520 comprises the signalling 522 of the event $E_i$. The signalling 522 of the event $E_i$ comprises the broadcast information of the content at a date and time on a given channel with $HD_i$ service, that is to say information on the different transport sessions. The information on the $HD_i$ service describes the transmission mode in which a part of the content, for example the HD quality, is accessible in pre-downloading. The signalling 522 is prepared by the TV operator in a step 521 and is received by the client in a step 523. During a step 524, the client analyses the signalling information 522 and selects service for the event $E_i$, either $HD_i$ with files downloading files, or $SD_i$ including standard broadcast without downloading. During a step 530, the client subscribes to $HD_i$ service thus having the rights to download prior to the broadcast, the part of the content corresponding for example to HD quality. Step 540 comprises the reception 543 of the second data stream 542 of $E_i$ for $HD_i$ service in a transport session and the recording 544 of this stream in the storage means of the reception device of the client. According to variant embodiments, the protocol to transmit and download the files is CDS, DSMCC or FLUTE. According to a particular characteristic, a step 540 comprises the automatic activation of the reception 543 from a standby state of the client reception device using signalling information 522 on the first and second transport session, in particular the date and time of the content broadcast $E_i$. According to another characteristic, step 550 comprises the activation of the reception 563 by the client at the time to the first stream broadcast $E_i$. During a step 560, the first data stream 562 of $E_i$ for an $SD_i$ service, for example of the broadcast in standard quality of the content, is transmitted in a transport session. According to various embodiments, this transmission uses the IP networks (IPTV) or broadcast networks such as satellite, terrestrial or cable (DVB MPEG2-TS). During a step 563, the reception device receives first data stream 562. During step 564 it synchronises, on-the-fly according to the reception of the first stream, the streams previously transmitted in the second transport sessions. The identifier $M_i$ is adapted to select among the streams recorded in the storage means of the device, the stream associated with the first stream of $E_i$. The RTS timestamp is adapted to synchronize data from the first stream and the second stream. Thus reconstructed stream is decoded during a step 565 and the client advantageously enjoys the content with an enhanced quality with respect to standard broadcast. Finally during step 570, the device deletes the second data stream after content broadcast, that is to say after the event Ei whether it was received and viewed by the client or not.

Figure 6:
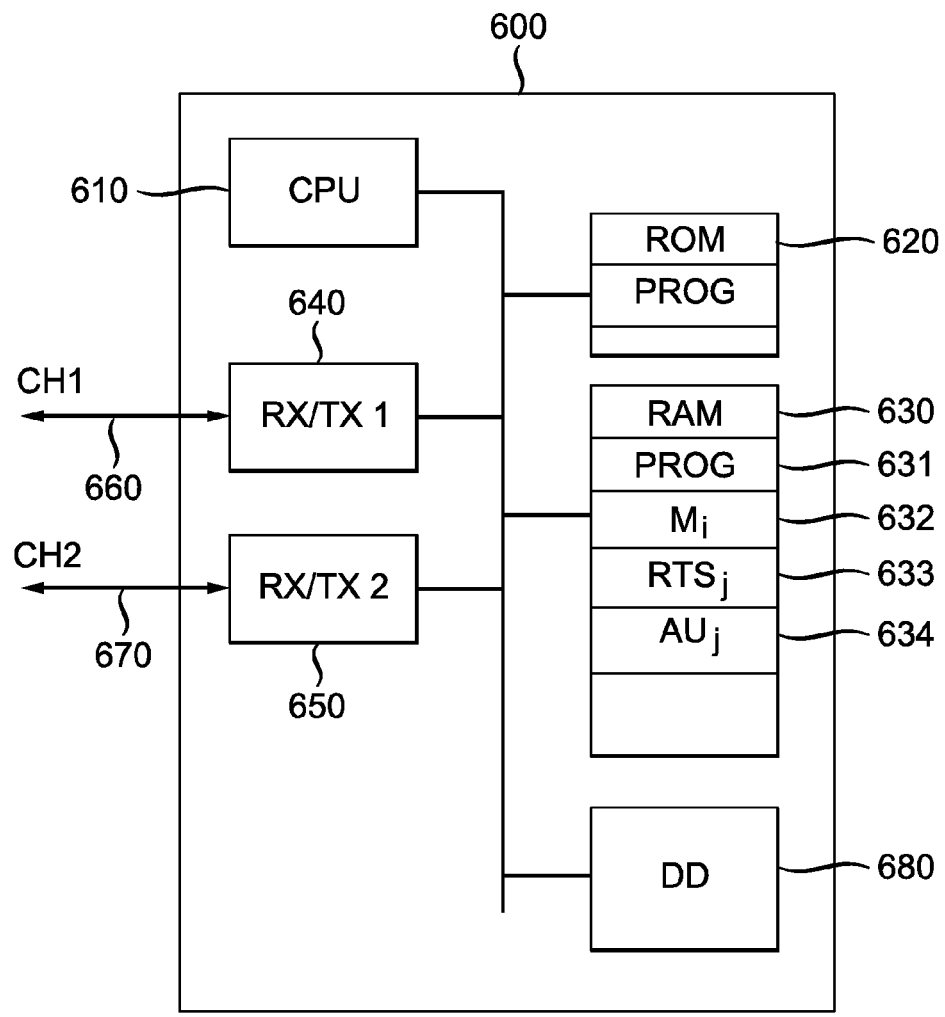
FIG. 6 shows a reception device implementing the invention.

FIG. 6 shows a reception device implementing the invention. The reception device is for example a digital TV decoder (set top box) connected to a network, an access gateway connected to an IP network or in the case of hybrid networks, a device assuring the reception on each of the networks. The device comprises physical means useful for implementing an embodiment of the invention, for example a processor 610 (CPU), a RAM 630 and a ROM 620, a hard disk 680 and at least one network interface 640, 650 such as cable, satellite or terrestrial demodulator, an IP port, an ADSL demodulator or a 3G modem for mobile networks. The network interface is adapted to data reception on an IP network, a television broadcast network, a mobile network on a transport channel 660, 670. The device stores the second data stream in the RAM memory or in the hard disk as a file comprising the identifier 632 $M_i$, the timestamps 633 $TS_j$ associated with each access unit $AU_j$ 634. The CPU assures the synchronization between data received by the network interface and data stored in the RAM or in the hard disk. According to an embodiment the CPU also assures the decoding of the reconstructed video stream and sends the decoded content to a display device such as a television screen.

What is claimed is:

1. A method for reception of encoded video contents and services, provided by a television operator to a multitude of reception devices, said encoded video contents and services being split into a first data stream and a second data stream, wherein said method comprises:
   receiving said first data stream transmitted during a first transport session;
   receiving said second data stream transmitted during a second transport session, said second data stream being transmitted prior to said first data stream and said second data stream not being able to be decoded without said first data stream;
   recording said second data stream in a storage repository of a reception device;
   continuously synchronizing said second data stream with said first data stream into a stream being sent to a decoder, wherein said encoded video contents and services comprises a succession of primary units, each numbered primary unit being associated with a video image; wherein each numbered primary unit comprises a succession of numbered secondary units, each numbered secondary unit being associated with a slice of said video image, wherein an item of identification information of the content, an item of numbering information for each numbered secondary unit, and an item of timestamp information for each numbered primary unit are inserted into said first transport session and said item of identification information of the content, said item of numbering information for each numbered secondary unit, and said item of timestamp information for each numbered primary unit are inserted into said second transport session, wherein said item of timestamp information is initialized for the first numbered primary unit of the video contents and services and wherein the synchronizing step further comprises ordering the numbered primary units and the numbered secondary units.

2. The method according to claim 1 wherein the timestamp information is inserted for each of the first numbered secondary unit of each primary unit.

3. The method according to claim 1 wherein the item of identification information of the content comprises an identifier associated with each of said video contents and services.

4. The method according to claim 3 wherein the identifier associated with each of said video contents and services is derived from a characteristic from among the following characteristics:
a title of the video content or service,
a theoretical date and time of the streaming or the broadcast of the video contents and services.

5. The method according claim 1, further comprising receiving signaling of said video contents and services comprising information on the first transport session and on the second transport session.

6. The method according to claim 5, further comprising activating the reception of said first data stream from said signaling information on the first transport session and on the second transport session.

7. The method according to claim 5, further comprising activating the reception of said second data stream using said signaling information on the first transport session and on the second transport session, or using a selection by the user of said reception device.

8. The method according claim 1, further comprising deleting, in the repository of the reception device, said second data stream after the transmission of said first data stream in a first transport session.

9. A device for reception of encoded video contents and services, delivered by a television operator to a multitude of said reception devices, said video contents and services being split into a first data stream and a second data stream, wherein the reception device comprises:
a first receiver configured to receive said first data stream transmitted during a first transport session;
a second receiver configured to receive said second data stream transmitted during a second transport session, said second data stream being transmitted prior to said first data stream and said second data stream not being able to be decoded without said first data stream;
a memory configured to record said second data stream in a storage repository of the reception device;
a processor configured to continuously synchronize said second data stream with said first data stream into a stream being sent to a decoder means, wherein said encoded video contents and services comprises a succession of numbered primary units, each numbered primary unit being associated with a video image; wherein each primary unit comprises a succession of numbered secondary units, each numbered secondary unit being associated with a slice of said video image, wherein an item of identification information of the content, an item of numbering information for each numbered secondary unit, and an item of timestamp information for each numbered primary unit are inserted into said first transport session and said item of identification information of the content, said item of numbering information for each numbered secondary unit, and said item of timestamp for each numbered primary unit are inserted into said second transport session, wherein said item of timestamp information is initialized for a first numbered primary unit of the video content and wherein the said processor is configured to order the numbered primary units and the numbered secondary units.

10. The reception device according to claim 9, wherein the timestamp information is inserted for each of the first numbered secondary unit of each numbered primary unit.

11. The reception device according to claim 9, wherein the item of identification information of the content comprises an identifier associated with each of said video contents and services.

12. The reception device according to claim 11, wherein the identifier associated with each of said video contents and services is derived from a characteristic from among the following characteristics:
a title of the video content or service,
a theoretical date and time of the streaming or the broadcast of the video content or service.

13. The reception device according to claim 9, wherein said first and second network interfaces are configured to receive signaling signaling of said video contents and services comprising information on the first transport session and on the second transport session.

14. The reception device according to claim 13, wherein the processor is further configured to activate the first receiver from said signaling information on the first transport session and on the second transport session.

15. The reception device according to claim 13, wherein the processor is further configured to activate the second receiver from using said signaling information on the first transport session and on the second transport session, or using a selection by the user of said reception device.

16. The reception device according to claim 9, wherein the memory is further configured to delete, in the storage repository of the reception device, said second data stream after the transmission of said first data stream in a first transport session.

* * * * *